United States Patent [19]

Burkard et al.

[11] Patent Number: 5,063,774
[45] Date of Patent: Nov. 12, 1991

[54] TIRE PRESSURE SENSOR FOR MOTOR VEHICLES

[75] Inventors: Johannes Burkard; Wolfgang Weltin, both of Nürnberg, Fed. Rep. of Germany

[73] Assignee: Robert Bosch GmbH, Stuttgart, Fed. Rep. of Germany

[21] Appl. No.: 576,383
[22] PCT Filed: Jan. 18, 1989
[86] PCT No.: PCT/DE89/00021
§ 371 Date: Sep. 18, 1990
§ 102(e) Date: Sep. 18, 1990
[87] PCT Pub. No.: WO89/10274
PCT Pub. Date: Nov. 2, 1989

[30] Foreign Application Priority Data

Apr. 23, 1988 [DE] Fed. Rep. of Germany ....... 3813846

[51] Int. Cl.$^5$ .............................................. B60C 23/04
[52] U.S. Cl. ................................ 73/146.5; 200/61.25; 340/444
[58] Field of Search ................. 73/146.5, 146.8, 146.3, 73/518, 535; 200/61.25; 340/442, 444; 116/34 R

[56] References Cited

U.S. PATENT DOCUMENTS

| 4,894,639 | 1/1990 | Schmiefef | 73/146.5 |
| 4,954,677 | 9/1990 | Alberte et al. | 73/146.5 |

Primary Examiner—Donald O. Woodiel
Attorney, Agent, or Firm—Michael J. Striker

[57] ABSTRACT

The tire pressure sensor for motor vehicle has a reference pressure chamber (19), which is constructed as a pressure switch, including a contact diaphragm (22) and a contact pin (23). The reference pressure chamber (19) is closed toward the rim side by a ring diaphragm (28) connected at its inner rim with the housing of the pressure switch and at its outer rim (29) with the contact diaphragm (22) via a mass ring (26) for the purpose of shifting the threshold value of the pressure switch in a speed-dependent manner.

3 Claims, 1 Drawing Sheet

TIRE PRESSURE SENSOR FOR MOTOR VEHICLES

BACKGROUND OF THE INVENTION

The invention is directed to a tire pressure sensor for motor vehicles.

A tire pressure sensor for sensing the pressure in a tire of a motor vehicle is known. This tire pressure sensor comprises a housing fixed on a wheel rim of a vehicle wheel, on which a tire whose pressure is to be measured is mounted, and a pressure switch which is mounted at the circumference of the wheel rim extending in a radial direction into the interior of the tire. The pressure switch includes a reference pressure chamber, which is closed on a side closet the tire interior by an electrically conducting contact diaphragm, which is arranged parallel to the tread of the tire and which respect to the housing, according to the relative tire pressure and is lifted according to speed of the tire by a mass, which is movable in a radial direction by centrifugal force for the purpose of speed-dependent raising of the switching threshold of the pressure switch.

Tire and vehicle manufacturers recommend increased tire pressures for higher vehicle speed. This can be taken into account in that the switching threshold is adjusted to the greatest required pressure by adjusting the pressure in the reference pressure chamber. This results in a loss in comfort at low speeds (compare DE-OS 32 43 845). On the other hand, if the tire pressure sensor is adjusted to the tire pressure recommended in the lower speed range at full load, the required higher tire pressure at high speeds is not monitored and the tire pressure monitoring device gives a false sense of security, which is dangerous precisely in this speed range.

It is known from DE-OS 26 26 475 to provide the diaphragm of the reference pressure chamber of a tire pressure sensor with a solid piston whose front side is contacted by the tube of the tire to be monitored, which presses in the diaphragm against the pressure in the reference pressure chamber, when there is sufficient air pressure in the tire, to the extent that an electrical contact in the reference pressure chamber is closed It is further mentioned in DE-OS 26 26 475 that centrifugal forces at the piston of the diaphragm advantageously reduce the force exerted on the diaphragm by the tire pressure at increasing speed, so that the tire pressure must be increased at higher speeds in order to keep the switching contact closed. However, it is disadvantageous that the piston which is used as added mass for the diaphragm is covered by the tube of the tire, so that the centrifugal forces acting on it act on the reference pressure chamber only in part and in an undefined manner for raising the switching threshold. It is therefore not possible with this solution to raise the switching threshold by a defined and reproducible amount at a determined speed relative to the stationary state, since the speed-dependent raising of the switching threshold can not be determined beforehand in this device.

SUMMARY OF THE INVENTION

On this basis, the object of the invention is to construct a tire pressure sensor with a speed-dependent shifting of the threshold value in such a way as to provide an increased, reproducible switching sensitivity and an improved coupling of the temperature of the reference pressure chamber to the temperature in the tire.

This object is met, according to the invention, the reference pressure chamber is closed toward the rim side (i.e. its peripheral edge) by a ring diaphragm connected at its inner rim with the housing of the pressure switch and at its outer rim with the contact diaphragm via a mass ring. Due to the intermediate ring diaphragm, the mass ring, generally a metal ring, can shift radially outward as a function of the centrifugal force acting on it and accordingly as a function of the driving speed. The state of equilibrium of the forces acting on the contact diaphragm in the opposite direction is shifted toward higher tire pressures, so that a shifting of the switching threshold value of the pressure switch toward higher pressures is effected. The pressure switch accordingly responds promptly to a drop in the tire pressure precisely at high speeds, when this is particularly important.

Since the tire pressure chamber projects practically in its entirety into the space enclosed by the tubeless tire as a result of this construction and is accordingly surrounded by the tire air, a very good temperature compensation is achieved between the temperature of the air in the interior of the tire and the gas in the reference pressure chamber, so that the particularly sensitive switching behavior, which is a result of the construction anyway, is further improved.

It is advantageously provided that the mass ring is welded with the ring diaphragm and the contact diaphragm. A durable connection and a hermetic sealing of the reference pressure chamber is accordingly achieved.

The radial width, thickness or material of the ring diaphragm, as well as the mass of the mass ring, are selected in such a way that a desired shifting of the speed-dependent switching threshold is achieved. The shifting of the switching threshold can thus be determined beforehand by means of different parameters which are in part completely independent of one another, so that it is possible to produce defined characteristic lines of the shifting of the threshold value as a function of the speed, depending on the specific application and on the respective manufacturer's allowances. In so doing, the spring characteristic of the ring diaphragm, which acts as plate spring, can also be utilized in particular in a controlled manner according to the known calculations. The speed-dependent arching of the contact diaphragm, which is to be influenced by means of the geometry and material of the latter, can likewise be determined along with this.

BRIEF DESCRIPTION OF THE DRAWING

Further features, advantages and details of the invention follow from the following description of a preferred embodiment example with the aid of the drawing.

DETAILED DESCRIPTION OF THE INVENTION

Figure 1:
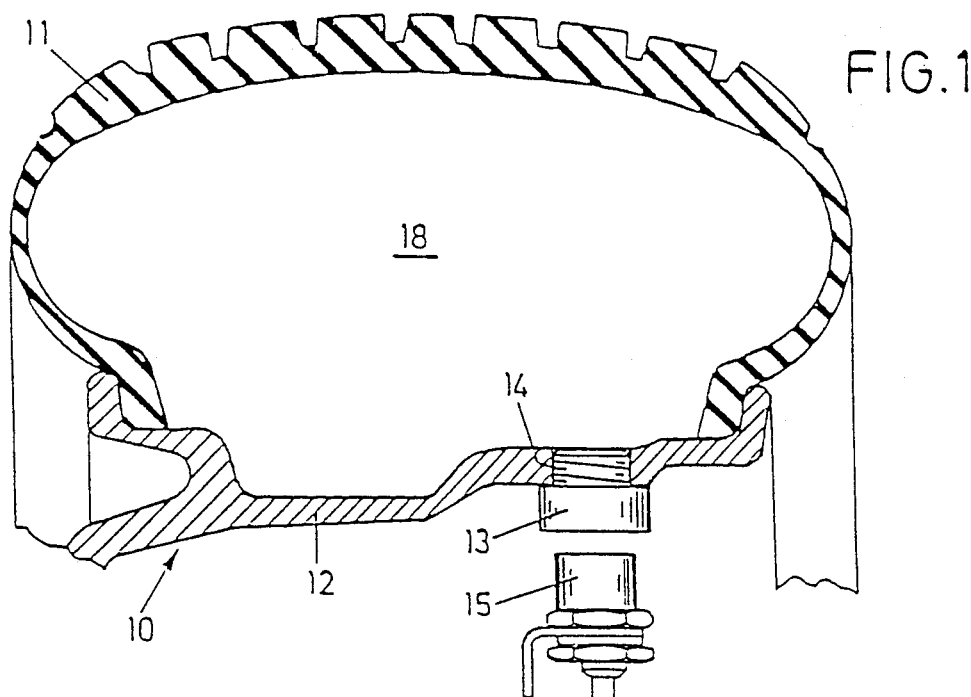
FIG. 1 is a cross sectional view through a tire and the radial outer portion of the respective rim with a schematic side view of a pressure sensor inserted in the latter.

A motor vehicle wheel is shown in FIG. 1 in reduced scale and is designated by 10. It shows a tire 11 which is fastened on a wheel rim 12. A tire pressure sensor 13 is fastened radially with respect to the wheel axis in a threaded bore hole 14 of the wheel rim 12 at an inwardly directed portion of the wheel rim 12. A signal pick-up 15 is fastened at a slight distance from the latter in the area of the tire pressure sensor 13 at the wheel suspension of the vehicle, not shown; the front side of the signal pick-up 15 is directed toward the tire pressure sensor 13 and feeds a high-frequency oscillation into the tire pressure sensor 13 as the latter passes by during every revolution of the vehicle wheel 10. The pick-up 15, together with the pick-ups of the remaining vehicle wheels, is connected to an evaluating circuit 16 with a connected warning display 17 which gives a warning signal when the air pressure in one of the tires is too low. Such a pressure sensor is described in more detail e.g in DE-OS 35 23 774.

Figure 2:
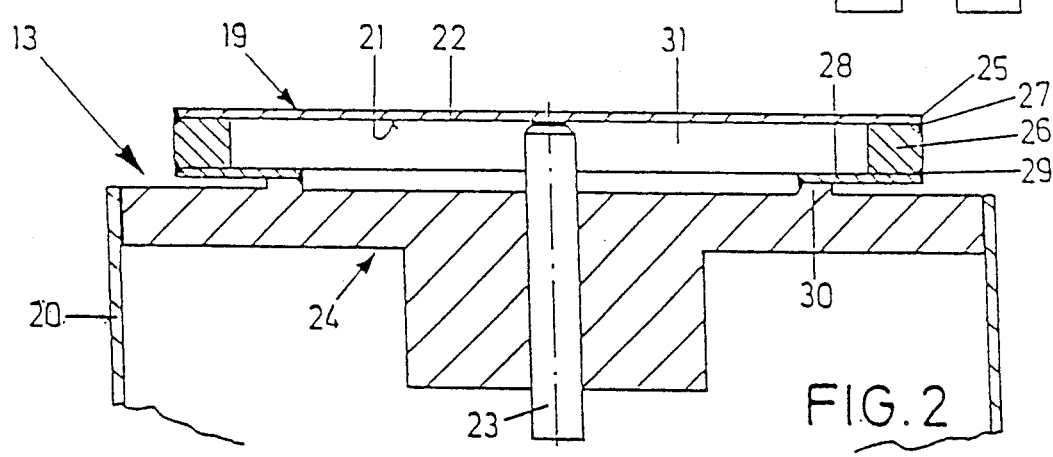
FIG. 2 is a cross sectional view through the reference pressure chamber area of a pressure sensor, according to the invention, in a stationary wheel.
Figure 3:
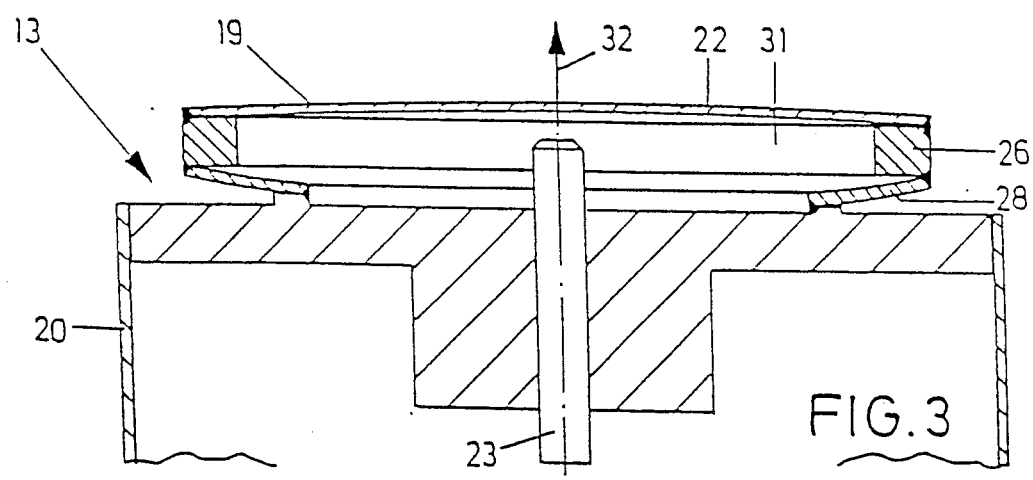
FIG. 3 shows a view, corresponding to FIG. 2, in a wheel turning at a higher speed.

The portion of the pressure sensor 13 facing the interior 18 of the tire, particularly the reference pressure chamber 19, is shown in more detail in FIGS. 2 and 3. It is not shown in particular how the housing 20 of the pressure sensor 13 is constructed and fixed in the rim 12.

The reference pressure chamber 19 comprises a diaphragm 22 which is metallized at least on its inside 21 and which cooperates as a pressure switch with a metal pin which acts as the switching contact 23 and is fastened in an upper cover 24 of the housing 20 so as to be insulated.

The outer rim 25 of the diaphragm 22 is welded at 27 with a mass ring 26 consisting of metal.

The mass ring 26 is welded at its underside to the outer peripheral rim 29, with a ring diaphragm 28 consisting of high-grade steel and having a thickness of 0.3 mm. The ring diaphragm 28 is connected with its inner rim 29 the cover 24 of the housing along an annularly extending projection 30 so as to be sealed, so that a reference gas pressure adjusted in the interior space 31 of the reference pressure chamber 19, formed in this way, is maintained.

The contact diaphragm 22 comprises e.g. a high-grade steel layer having a thickness of 0.2 mm and is welded with the mass ring 26 by a laser beam. The contact pin 23 can carry a contact ball consisting of gold at its front end, which contact ball is not shown in detail in the drawing. The interior space 31 of the reference pressure chamber 19 is filled with air or nitrogen with the required reference pressure in a manner known per se via a filling duct, not shown. After the reference pressure chamber 19 is filled, the filling duct is closed so as to be tight against pressure. This final state is shown in FIGS. 2 and 3.

In the rest state, shown in FIG. 2, the pressure switch formed by the diaphragm 22 and the contact pin 23 functions in a conventional manner in such a way that the diaphragm 22 is raised when there is a drop in pressure in the interior 18 of the tire because of the gas pressure in the interior space 31 of the reference pressure chamber (FIG. 2, at top), so that the conductive connection between the metallized inside 21 of the diaphragm 22 and the contact pin 23 is interrupted and a pressure drop signal can accordingly be detected. The diaphragm 22 according to FIG. 2 contacts the contact pin 23 when there is sufficient tire pressure.

FIG. 3 shows the behavior of the pressure switch when the wheel 10 rotates at a relatively high speed at the same tire pressure as in FIG. 2. Due to the centrifugal force, shown by the arrow 32, the mass ring 26 is drawn outward as are the contact diaphragm 22 and the ring diaphragm 28, so that the diaphragm 22 is lifted from the contact pin 23. A higher tire pressure must now be provided in order to adjust the state of equilibrium shown in FIG. 2, which higher tire pressure acts on the contact diaphragm 22 in a direction opposite the arrow 32, so that a shifting of the switching threshold toward the higher pressures is achieved in this way. With a diaphragm diameter of 20 mm, the entire arching of the diaphragms 22 and 28 at high driving speeds amounts to only approximately 50 $\mu$m, which corresponds to a switching threshold increase of approximately 0.5 bar. In so doing, according to the example in FIG. 3, the ring diaphragm 28 is lifted by means of the mass ring 26 approximately twice as much as the contact diaphragm 22 because of its inherent mass. In this case, the arching of the contact diaphragm 22 is also consequently to be taken into account in the raising of the switching threshold. On the other hand, if the speed-dependent raising of the switching threshold is decisively effected by means of a corresponding dimensioning of the ring diaphragm 28 and mass ring 26, the arching of a contact diaphragm 22 of low mass can possibly be ignored.

It will be understood that each of the elements described above, or two or more together, may also find a useful application in other types of structures differing from the types described above.

While the invention has been illustrated and described as embodied in a tire sensor for a motor vehicle, it is not intended and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. In a tire pressure sensor for a motor vehicle comprising a housing and a pressure switch which extends at the circumference of a wheel rim of a vehicle wheel in a radial direction toward an interior of a tire mounted on said wheel rim, said pressure switch comprising a switching contact fixed relative to said housing and a reference pressure chamber provided with an electrically conducting contact diaphragm closing said pressure chamber on a side of said pressure chamber closest to the interior of the tire and positioned substantially parallel to the wheel rim, said contact diaphragm cooperating with said switching contact as a function of relative tire pressure, so that said conducting contact diaphragm is lifted as a function of speed of said tire by a mass which is movable in a radial direction by centrifugal force for speed-dependent raising of a switching threshold of the pressure switch, the improvement wherein the reference pressure chamber (19) is closed on another side of said pressure chamber opposite said side closest to the interior of the tire by a ring diaphragm (28) having an outer peripheral rim (29) and an inner rim (29'), said ring diaphragm (28) being connected at the inner rim with the housing of the pressure switch and at the outer rim with the contact diaphragm (22) via a mass ring (26).

2. In a tire pressure sensor for a motor vehicle comprising a housing attached to a wheel rim of the motor vehicle and a pressure switch mounted on the wheel rim, said pressure switch extending radially into an interior of a tire mounted on the wheel rim, said pressure switch comprising a switching contact mounted in a fixed position relative to said housing and a reference pressure chamber provided with an electrically conducting contact diaphragm closing the pressure chamber, on which said switching contact can contact depending on a relative tire pressure in the tire, said electrically conducting contact diaphragm closing said pressure chamber on a side of said pressure chamber closest to the interior of the tire and arranged substantially parallel to the wheel rim, so that the conducting contact diaphragm is lifted depending on a speed of the tire by a mass which is movable in a radial direction by centrifugal force for speed-dependent raising of a switching threshold of the pressure switch, the improvement comprising a mass ring (26) and a ring diaphragm (28) having an outer peripheral rim (29), said outer peripheral rim (29) of the ring diaphragm being attached to the electrically conducting diaphragm via the mass ring, said ring diaphragm also being attached to said housing and said ring diaphragm acting to close said pressure chamber on another side of said pressure chamber opposite said side closest to the interior of the tire, so as to provide a comparatively increased switching sensitivity and coupling of a temperature of the reference pressure chamber to a tire temperature.

3. The improvement according to claim 2, wherein said ring diaphragm is attached to said housing in the vicinity of an inner rim of said ring diaphragm.

* * * * *